(12) United States Patent
Cotner et al.

(10) Patent No.: US 8,782,641 B2
(45) Date of Patent: Jul. 15, 2014

(54) TUNING OF WORK TO MEET PERFORMANCE GOAL

(75) Inventors: Curt Lee Cotner, Gilroy, CA (US); You-Chin Fuh, San Jose, CA (US); Holger Karn, Aidlingen (DE); James R. Porell, Standfordville, NY (US); Bryan Frederick Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2277 days.

(21) Appl. No.: 11/339,002

(22) Filed: Jan. 24, 2006

(65) Prior Publication Data

US 2007/0174838 A1    Jul. 26, 2007

(51) Int. Cl.
*G06F 9/46*    (2006.01)

(52) U.S. Cl.
USPC .......................................... 718/100

(58) Field of Classification Search
USPC ........................................................ 718/100
See application file for complete search history.

(56) References Cited

U.S. PATENT DOCUMENTS

| 5,473,773 A | 12/1995 | Aman et al. |
| 5,819,033 A | 10/1998 | Caccavale |
| 6,018,759 A * | 1/2000 | Doing et al. .................. 718/108 |
| 2003/0177414 A1 * | 9/2003 | Pillutla et al. .................. 714/25 |
| 2004/0034746 A1 | 2/2004 | Horn et al. |
| 2004/0181794 A1 * | 9/2004 | Coleman et al. .............. 718/104 |
| 2004/0193394 A1 * | 9/2004 | Levit-Gurevich et al. ...... 703/22 |

* cited by examiner

*Primary Examiner* — Gregory A Kessler
(74) *Attorney, Agent, or Firm* — Janaki K Davda; Konrad, Raynes, Davda & Victor LLP (57) ABSTRACT

Techniques are provided for tuning work. In response to identifying a trigger for a work, automatic tuning is invoked. The trigger indicates that a performance goal for the work has been missed. The work is analyzed. A tuning operation is selected for the work based on a tuning history. The selected tuning operation is implemented for the work.

21 Claims, 5 Drawing Sheets

TUNING OF WORK TO MEET PERFORMANCE GOAL

BACKGROUND

1. Field

Embodiments of the invention relate to tuning of work to meet one or more performance goals.

2. Description of the Related Art

When work is submitted to a server for processing, the work may be assigned a performance goal (e.g., the IBM® z/OS® operating system provides a performance goal using a Workload Manager). The term work may be described as a task that is awaiting resources for execution. The performance goal, for example, may be expressed as a response time goal (e.g., the work is to be completed within 30 seconds). The performance goal is either met or not met. When processing of work does not meet the performance goal associated with the work, an operating system may attempt to help the work complete quickly by assigning additional resources to the work. Reports may then be generated that indicate which performance goals were met (i.e., which work met the associated performance goal, and which work did not meet its goal).

For work that does not meet the performance goals, a skilled technician examines the work and determine why processing of the work did not meet the performance goal and whether the performance goal is attainable. The technician manually tunes various parts of the work or the processing system (e.g., a computer system or a network of computer systems) in order for the work to meet the associated performance goal. This tuning process may include collecting instrumentation data, analyzing the collected data, taking some action, and then rerunning the work to see whether the performance goal is achieved. Instrumentation data may be described as diagnostic data (e.g., how many CPU seconds were consumed by the work, were there Input/Output (I/O) delays, etc.). However, sometimes, the technician does not have the luxury of being able to examine the work after the work has completed because the work is dynamically created. In this case, the technician attempts to manually recreate the work in order to follow the manual tuning process.

Some conventional systems offer approaches to improving performance in real-time, but these systems may be improved. Thus, there is a need in the art for an improved tuning system.

SUMMARY

Provided are a method, computer program product, and system for tuning work. In response to identifying a trigger for a work, automatic tuning is invoked. The trigger indicates that a performance goal for the work has been missed. The work is analyzed. A tuning operation is selected for the work based on a tuning history. The selected tuning operation is implemented for the work.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of embodiments of the invention.

Figure 1:
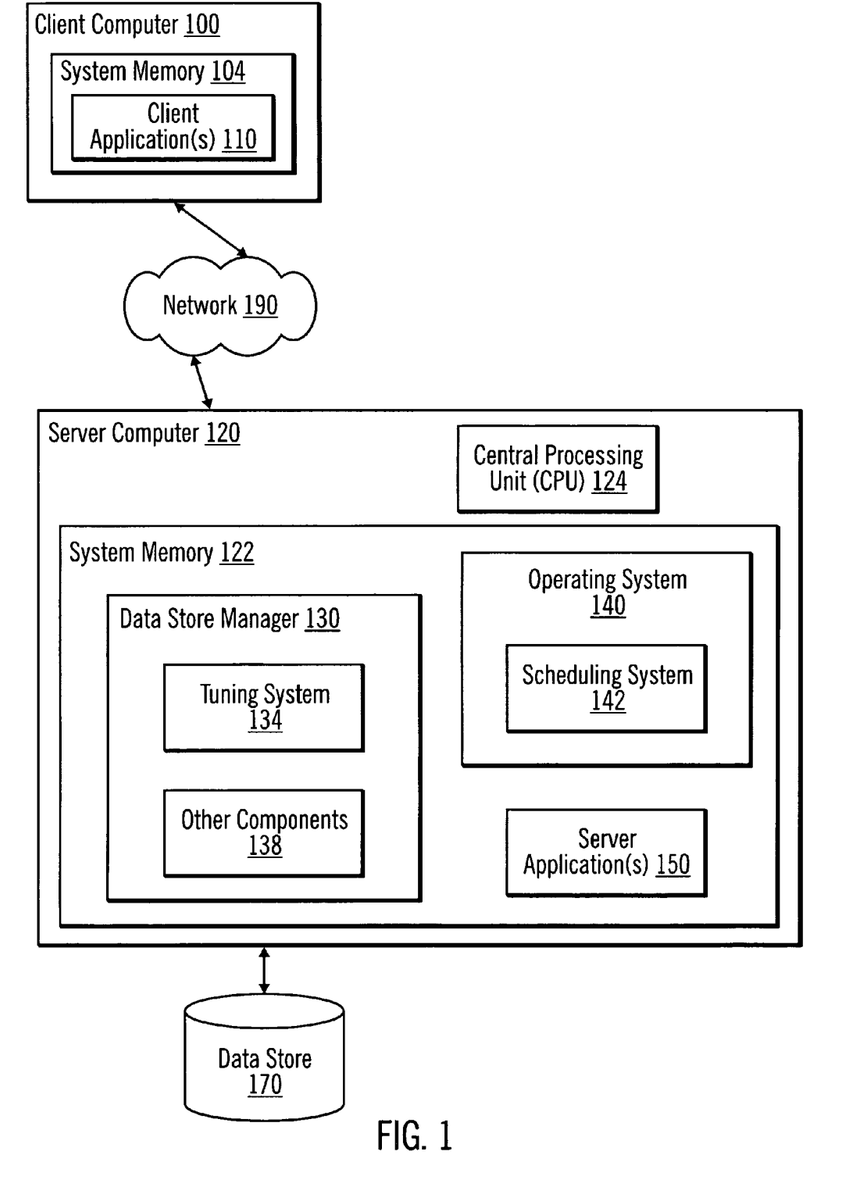
FIG. 1 illustrates details of a computer architecture in accordance with certain embodiments.

FIG. 1 illustrates details of a computer architecture in accordance with certain embodiments. A client computer 100 is connected via a network 190 to a server computer 120. The client computer 100 includes system memory 104, which may be implemented in volatile and/or non-volatile devices. One or more client applications 110 (i.e., computer programs) are stored in the system memory 104 for execution by a processor (e.g., a Central Processing Unit (CPU)) (not shown).

The server computer 120 includes system memory 122, which may be implemented in volatile and/or non-volatile devices, and a Central Processing Unit (CPU) 124. System memory 122 stores a data store manager 130 (e.g., a DataBase Management System (DBMS)). The data store manager 130 includes a tuning system 134 and other components 138. The system memory 122 also stores an operating system 140, which includes a scheduling system 142, and one or more server applications 150. These computer programs that are stored in system memory 122 are executed by the CPU 124. The server computer 120 provides the client computer 100 with access to data in a data store 170.

In alternative embodiments, the computer programs may be implemented as hardware, software, or a combination of hardware and software.

The client computer 100 and server computer 120 may comprise any computing device known in the art, such as a server, mainframe, workstation, personal computer, hand held computer, laptop telephony device, network appliance, etc.

The network 190 may comprise any type of network, such as, for example, a Storage Area Network (SAN), a Local Area Network (LAN), Wide Area Network (WAN), the Internet, an Intranet, etc.

The data store 170 may comprise an array of storage devices, such as Direct Access Storage Devices (DASDs), Just a Bunch of Disks (JBOD), Redundant Array of Independent Disks (RAID), virtualization device, etc.

Embodiments automatically detect processing of work that is not meeting one or more associated performance goals, collect instrumentation data, analyze the instrumentation data, and tune the work and/or system in an attempt to meet the one or more performance goals. Thus, embodiments provide an autonomic performance problem determination and resolution technique that is useful, for example, in on-demand environments.

Figure 2A:
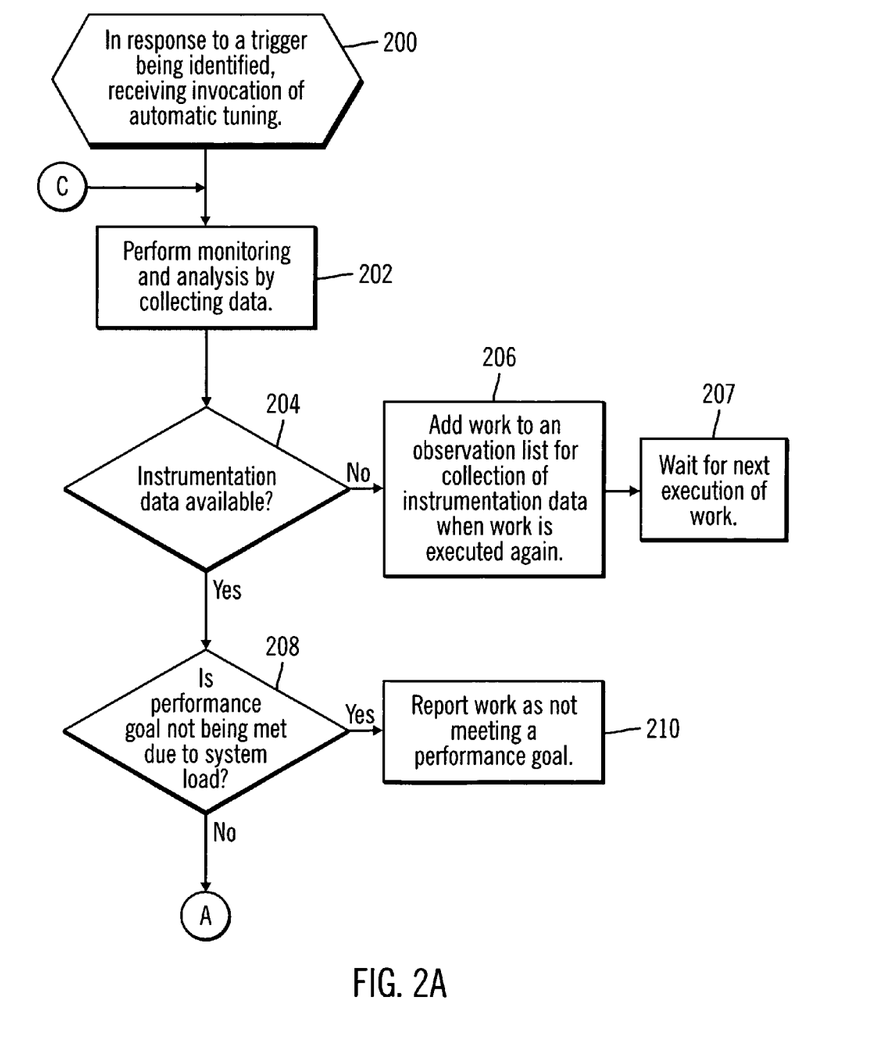
FIGS. 2A, 2B, and 2C illustrate logic in accordance with certain embodiments.
Figure 2B:
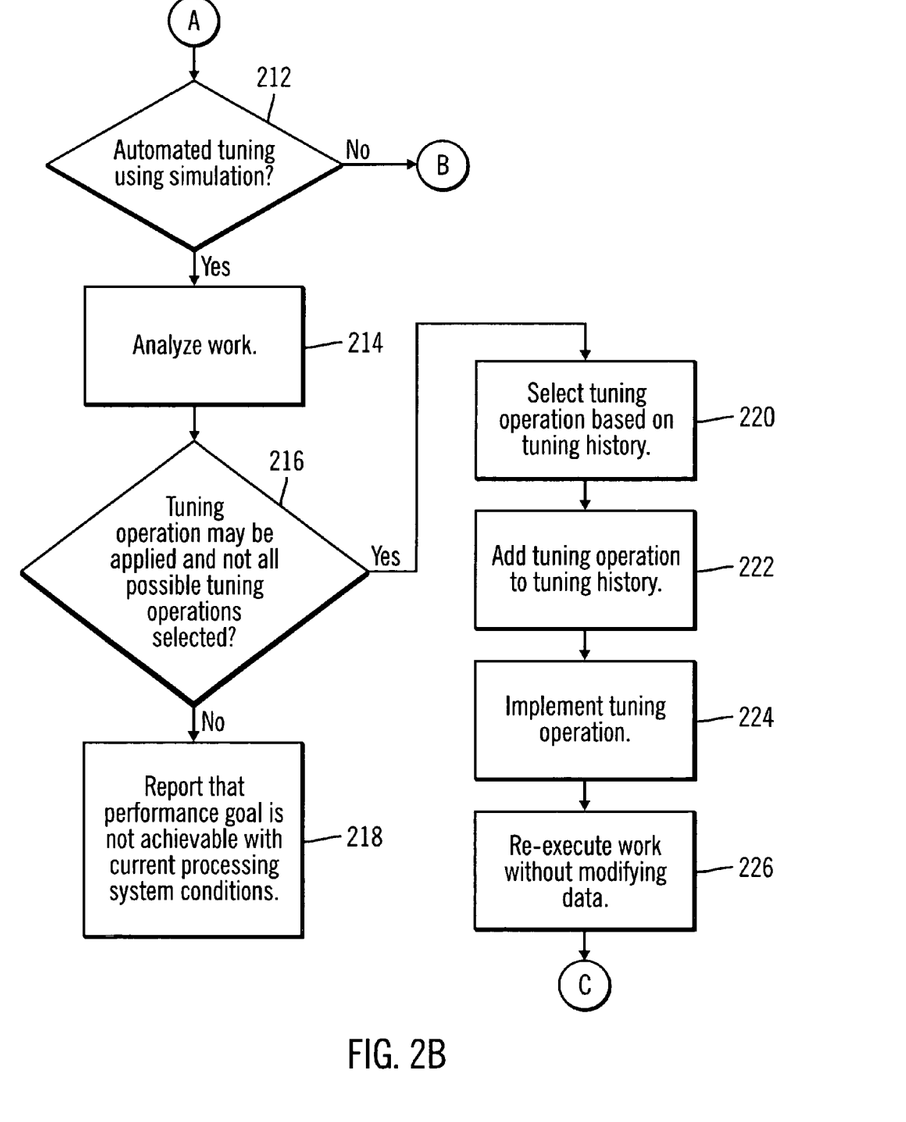
Figure 2C:
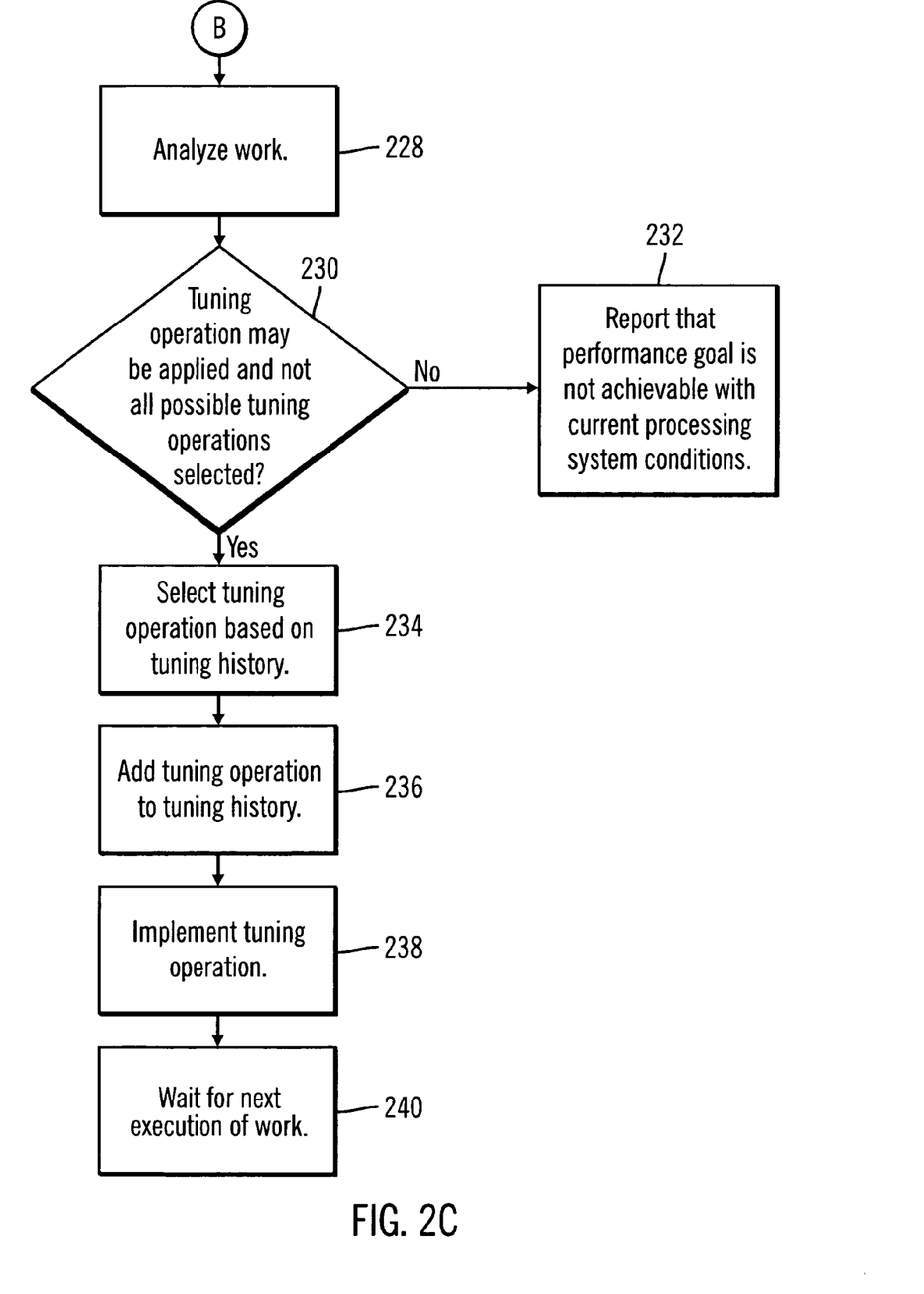

FIGS. 2A, 2B, and 2C illustrate logic in accordance with certain embodiments. Control begins at block 200 with the tuning system 134 being invoked in response to a trigger being identified by the scheduling system 142 to perform automatic tuning for particular work that did not meet one or more performance goals. The trigger may be received from a scheduling system 142, which is part of an operating system 140. The trigger may be described as a missed performance goal. That is, the scheduling system 142 may determine that a performance goal was missed and invoke the tuning system 134. Some sources for missed goals are, for example: an operating system response time for work (e.g., using a response time ratio parameter); a data store manager 130 dynamic statement cache that stores a history of statistics for execution of a statement (e.g., a SQL query); a data store manager 130 static statement cache that stores statistics to detect missed goals for execution of a statement; or a data store manager 130 resource governor (e.g., a DB2® for z/OS® Resource Limit Facility system available from International Business Machines Corporation). With a response time ratio parameter, if a performance goal is two seconds, and the actual time for processing the work is four seconds, the ratio would be 4/2=2, and, if a specified ratio is not met, then the tuning system 134 is invoked. The statement cache may store statistics, such as, the number of times a statement was executed, the I/O resources used to execute the statement, and CPU usage for executing the statement. With the statement cache, if certain statistics indicate that performance goals are not being met, then the tuning system 134 is invoked. A resource governor enables setting a resource limit so that if work uses more resources than set, the tuning system 134 is triggered.

In block 202, the tuning system 134 performs monitoring and analysis by collecting instrumentation data. In certain embodiments, instrumentation data is not collected with the execution of each work, but is collected for work that has not met a performance goal during a prior execution. Once it is determined that work is not meeting one or more performance goals, the instrumentation data needed for diagnosing the performance problem is collected.

The collected instrumentation data may include information used to analyze executions, such as statement information (e.g., timings, I/O activity, buffer pool activity, etc.), overall system workload (e.g., CPU usage, available memory on system, etc.), access plans, utility status (e.g., if online backup is currently running), network times (if distributed application), and coupling facility utilization (e.g., when multiple computer systems are coupled together, a management component coordinates work among clusters of the computers, and the coupling facility utilization may be described as the utilization of this management component).

In block 204, it is determined whether instrumentation data is available. If so, processing continues to block 208, otherwise, processing continues to block 206. In some embodiments, the needed instrumentation data may not be available because the work was executed without collecting the instrumentation data. In block 206, the work is added to an observation list for collection of instrumentation data when the work is executed again. Adding the work to an observation list may include, for example, storing a statement ID in a statement cache or by storing a statement ID and package name for static SQL statements). In block 207, the tuning system 134 waits for the next execution of the work. In certain embodiments, when work is added to the observation list, then, when the work is re-executed, the tuning system 134 is automatically triggered.

In block 208, it is determined whether a performance goal is not being met due to processing system load. If so, processing continues to block 210, otherwise, processing continues to block 212 (FIG. 2B). In block 210, the work is reported as not meeting a performance goal. As an example of a performance goal not being met due to processing system load, if a CPU-bound On-Line Transaction Processing (OLTP) query is evaluated with a fully matching index scan and a number of rows processed is close to a number of rows returned, the OLTP query may have missed a performance goal due to high concurrency (i.e., other queries are being executed in an overlapping manner, which prevents the OLTP query of the example from executing within its performance goal). This may be confirmed by looking at, for example, the actual split of elapsed time spent within a data store manager 130, CPU time, I/O time, and not-accounted time.

In block 212, it is determined whether automated tuning using simulation is to be performed. If so, processing continues to block 214, otherwise, processing continues to block 228 (FIG. 2C). In block 214, the tuning system 134 analyzes the work that did not meet a performance goal. This analysis determines whether any tuning operation is available that may be applied to enable the work to meet one or more performance goals based on the instrumentation data. In block 216, the tuning system determines whether a tuning operation may be applied and not all possible tuning operations have been selected. If so, processing continues to block 220, otherwise, processing continues to block 218. In block 218, the tuning system 134 reports that the performance goal is not achievable with current processing system conditions.

In block 220, the tuning system 134 selects a tuning operation based on the tuning history. In particular, each tuning operation selected for one work is stored in a tuning history (e.g., a table or file). Use of the tuning history avoids loops in selection of tuning operations (e.g. creation of an index as one tuning operation and deletion of that same index as another tuning operation).

In block 222, the selected tuning operation is added to the tuning history. In block 224, the tuning system 134 implements the tuning operation. In block 226, the tuning system 134 re-executes the work without modifying data (i.e., the re-executing uses a copy of the data (also referred to as a "virtual" copy) rather than the original data). From block 226, processing continues to block 202 (FIG. 2A) for further tuning.

Thus, with the automated tuning using simulation, work is re-executed inside the server computer 120 using a copy of data, which avoids modifying the original data. Instrumentation data is collected for this virtual execution and analyzed again. If further tuning is possible, simulation may be repeated until the performance goal is achieved or no further tuning is possible.

In block 212, if automated tuning using simulation was not to be performed, then, iterative tuning is performed starting with block 228. In FIG. C, in block 228, the tuning system analyzes the work for which the tuning system 134 was invoked. In block 230, the tuning system 134 determines whether a tuning operation may be applied and not all possible tuning operations have been selected. If so, processing continues to block 234, otherwise, processing continues to block 232. In block 232, the tuning system 134 reports that the performance goal is not achievable with current processing system conditions.

In block 234, the tuning system 134 selects a tuning operation based on the tuning history. In block 236, the selected tuning operation is added to the tuning history. In block 238, the tuning system 134 implements the tuning operation. For example, if the tuning operation is to add an index, then implementation of the tuning operation is to add the index. As another example, if the tuning operation is to rewrite the query, then the implementation of the tuning operation rewrites the query. In block 240, the tuning system 134 waits for the next execution of the work to determine whether the performance goal is met. If the performance goal is not met, the tuning system 134 is triggered for the work.

Thus, with iterative tuning, the tuning operation is performed. If the work does not meet a performance goal with a next execution, then the next tuning iteration is performed.

Tuning operations may be described as operations that may allow work to meet a performance goal (e.g., an operation to improve execution). Example tuning operations are: creation/deletion of index or materialized query tables, changing system parameters, buffer pool tuning (i.e., moving an object from one buffer pool to a different buffer pool or resizing a buffer pool), or running a RUNSTATS or REORG operation.

If all possible tuning operations are performed, and the goal is still not reached, the specified goal violations is flagged as unreachable to allow a technician to review performance goals and reassess capacity. Further analysis of the collected instrumentation data may distinguish between unrealistic goals (e.g., a performance goal is far below a realistic value) and goal violations caused by system workload (e.g., system is too busy to reach goal).

An example will be provided merely to enhance understanding of the invention and it is to be understood that embodiments are not intended to be limited to the example.

A class of work (Sample Class) is classified with a response time performance goal of two seconds. A query (Sample Query) is part of the Sample Class. The Sample Query runs and completes in 20 seconds. The execution environment stores an indication that this query did not meet a performance goal. In certain embodiments, instrumentation data is not collected with the execution of each work, but is collected for work that has not met a performance goal during a prior execution. The Sample Query enters the execution environment again. Instrumentation is started for the Sample Query. The Sample Query runs and completes in 19 seconds. Instrumentation is stopped and stored for analysis. The tuning system 134 determines that the best tuning operation is to collect additional column distribution statistics. The implementation of the tuning operation collects and stores additional column distribution statistics. Sample Query enters the execution environment again. Instrumentation is started for Sample Query. Sample Query runs and completes in 2 seconds. Instrumentation is stopped and discarded since Sample Query is meeting the performance goal.

Thus, embodiments take a proactive approach of meeting performance goals. In certain embodiments, embodiments analyze and tune work that consumes the most resources.

IBM and z/OS are registered trademarks or common law marks of International Business Machines Corporation in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

Thus, a computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, and/or combinations of software and hardware.

The logic of FIGS. 2A, 2B, and 2C describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2A, 2B, and 2C may be implemented in software, hardware, programmable and non-programmable gate array logic or in some combination of hardware, software, or gate array logic.

Figure 3:
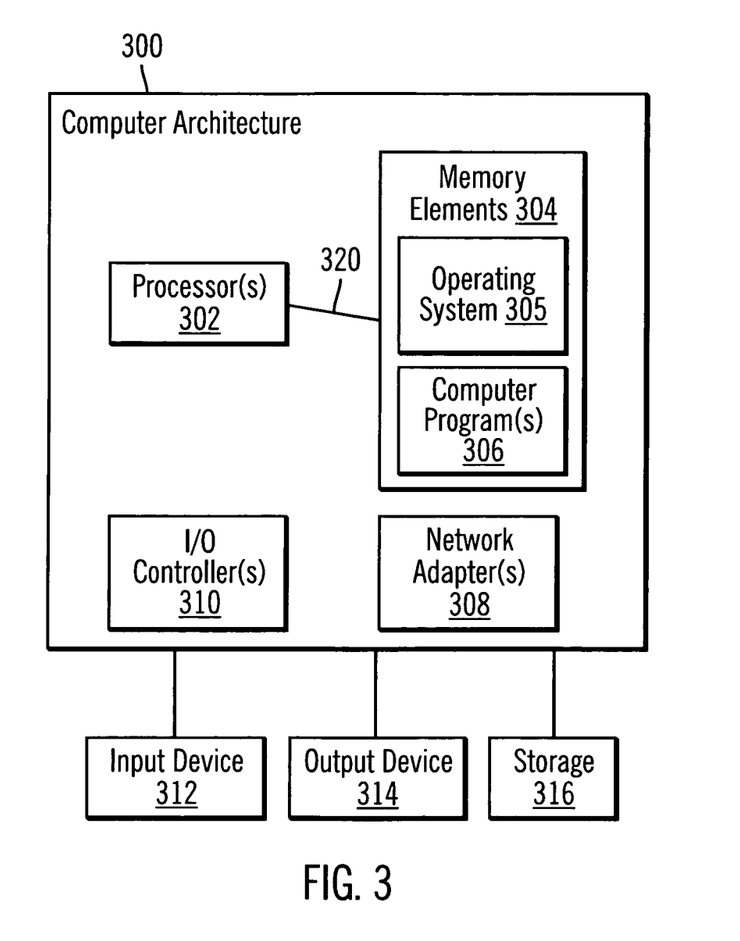
FIG. 3 illustrates an architecture of a computer system that may be used in accordance with certain embodiments.

FIG. 3 illustrates a system architecture 300 that may be used in accordance with certain embodiments. Local computing device 100, storage controller 120, and/or remote backup system 130 may implement system architecture 300. The system architecture 300 is suitable for storing and/or executing program code and includes at least one processor 302 coupled directly or indirectly to memory elements 304 through a system bus 320. The memory elements 304 may include local memory employed during actual execution of the program code, bulk storage, and cache memories which provide temporary storage of at least some program code in order to reduce the number of times code must be retrieved from bulk storage during execution. The memory elements 304 may store an operating system 305 and one or more computer programs 306.

Input/output or I/O devices 312, 314 (including but not limited to keyboards, displays, pointing devices, etc.) may be coupled to the system either directly or through intervening I/O controllers 310.

Network adapters 308 may also be coupled to the system to enable the data processing system to become coupled to other data processing systems or remote printers or storage devices through intervening private or public networks. Modems, cable modem and Ethernet cards are just a few of the currently available types of network adapters 308.

The system architecture 300 may be coupled to storage 316 (e.g., a non-volatile storage area, such as magnetic disk drives, optical disk drives, a tape drive, etc.). The storage 310 may comprise an internal storage device or an attached or network accessible storage. Computer programs 306 in storage 310 may be loaded into the memory elements 304 and executed by a processor 302 in a manner known in the art.

The system architecture 300 may include fewer components than illustrated, additional components not illustrated herein, or some combination of the components illustrated and additional components. The system architecture 300 may comprise any computing device known in the art, such as a mainframe, server, personal computer, workstation, laptop, handheld computer, telephony device, network appliance, virtualization device, storage controller, etc. The foregoing description of embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments can be made without departing from the spirit and scope of the invention, the embodiments reside in the claims hereinafter appended or any subsequently-filed claims, and their equivalents.

What is claimed is:

1. A method for performing tuning, comprising:
in response to determining that execution of a work did not meet a performance goal, adding, using a processor of a computer, the work to an observation list for automatic tuning for the work during a subsequent execution of the work;
during the subsequent execution of the work,
in response to determining that iterative tuning is to be performed,
selecting a tuning operation from a set of tuning operations and based on a tuning history that identifies previously selected tuning operations;
implementing the selected tuning operation for the work; and
in another subsequent execution of the work, determining whether the selected tuning operation met the performance goal with the implemented tuning operation; and
in response to determining that automated tuning using simulation is to be performed, re-executing the work using a copy of data and by implementing a different tuning operation in each of one or more simulations until one of the performance goal is achieved and no further tuning is possible, wherein the tuning operation is selected from the set of tuning operations and based on the tuning history.

2. The method of claim 1, wherein a source for the missed performance goal includes at least one of an operating system response time for work, a data store manager dynamic statement cache, a data store manager static statement cache, and a data store manager resource governor.

3. The method of claim 1, further comprising:
in response to determining that the work did not meet the performance goal in a prior execution, in a next execution of the work, performing monitoring and analysis by collecting instrumentation data for the work in the next execution, wherein the instrumentation data was not collected during the prior execution.

4. The method of claim 3, further comprising:
determining whether instrumentation data is available; and
in response to determining that the instrumentation data is not available, adding the work to the observation list for collection of instrumentation data when the work is executed again.

5. The method of claim 1, further comprising:
determining whether all possible tuning operations have been selected for the work;
in response to determining that not all possible tuning operations have been selected, selecting the tuning operation based on the tuning history; and
in response to determining that all possible tuning operations have been selected, reporting that the performance goal is not achievable with current processing system conditions.

6. The method of claim 1, further comprising:
storing the selected tuning operation in the tuning history.

7. The method of claim 1, further comprising:
determining whether the performance goal is not being met due to processing system load; and
in response to determining that the performance goal is not being met due to processing system load, issuing a report.

8. A computer program product for performing tuning comprising a computer-readable storage medium comprising one of hardware and a combination of hardware and software and including a computer readable program, wherein the computer readable program when executed on a computer causes the computer to:
in response to determining that execution of a work did not meet a performance goal, add the work to an observation list for automatic tuning for the work during a subsequent execution of the work;
during the subsequent execution of the work,
in response to determining that iterative tuning is to be performed,
select a tuning operation from a set of tuning operations and based on a tuning history that identifies previously selected tuning operations;
implement the selected tuning operation for the work; and
in another subsequent execution of the work, determine whether the selected tuning operation met the performance goal with the implemented tuning operation; and
in response to determining that automated tuning using simulation is to be performed, re-execute the work using a copy of data and by implementing a different tuning operation in each of one or more simulations until one of the performance goal is achieved and no further tuning is possible, wherein the tuning operation is selected from the set of tuning operations and based on the tuning history.

9. The computer program product of claim 8, wherein a source for the missed performance goal includes at least one of an operating system response time for work, a data store manager dynamic statement cache, a data store manager static statement cache, and a data store manager resource governor.

10. The computer program product of claim 8, wherein the computer readable program when executed on a computer causes the computer to:
in response to determining that the work did not meet the performance goal in a prior execution, in a next execution of the work, perform monitoring and analysis by collecting instrumentation data for the work in the next execution, wherein the instrumentation data was not collected during the prior execution.

11. The computer program product of claim 10, wherein the computer readable program when executed on a computer causes the computer to:
determine whether instrumentation data is available; and
in response to determining that the instrumentation data is not available, add the work to the observation list for collection of instrumentation data when the work is executed again.

12. The computer program product of claim 9, wherein the computer readable program when executed on a computer causes the computer to:
determine whether all possible tuning operations have been selected for the work;
in response to determining that not all possible tuning operations have been selected, select the tuning operation based on the tuning history; and
in response to determining that all possible tuning operations have been selected, report that the performance goal is not achievable with current processing system conditions.

13. The computer program product of claim 9, wherein the computer readable program when executed on a computer causes the computer to:
store the selected tuning operation in the tuning history.

14. The computer program product of claim 9, wherein the computer readable program when executed on a computer causes the computer to:
determine whether the performance goal is not being met due to processing system load; and
in response to determining that the performance goal is not being met due to processing system load, issue a report.

15. A system for performing tuning, comprising:
a processor; and
hardware logic coupled to the processor and causing operations to be performed, the operations comprising:
in response to determining that execution of a work did not meet a performance goal, adding, using a processor of a computer, the work to an observation list for automatic tuning for the work during a subsequent execution of the work;
during the subsequent execution of the work,
in response to determining that iterative tuning is to be performed,
selecting a tuning operation from a set of tuning operations and based on a tuning history that identifies previously selected tuning operations;
implementing the selected tuning operation for the work; and
in another subsequent execution of the work, determining whether the selected tuning operation met the performance goal with the implemented tuning operation; and
in response to determining that automated tuning using simulation is to be performed, re-executing the work using a copy of data and by implementing a different tuning operation in each of one or more simulations until one of the performance goal is achieved and no further tuning is possible, wherein the tuning operation is selected from the set of tuning operations and based on the tuning history.

16. The system of claim 15, wherein a source for the missed performance goal includes at least one of an operating system response time for work, a data store manager dynamic statement cache, a data store manager static statement cache, and a data store manager resource governor.

17. The system of claim 15, wherein the operations further comprise:
in response to determining that the work did not meet the performance goal in a prior execution, in a next execution of the work, performing monitoring and analysis by collecting instrumentation data for the work in the next execution, wherein the instrumentation data was not collected during the prior execution.

18. The system of claim 17, wherein the operations further comprise:
determining whether instrumentation data is available; and
in response to determining that the instrumentation data is not available, adding the work to the observation list for collection of instrumentation data when the work is executed again.

19. The system of claim 15, wherein the operations further comprise:
determining whether all possible tuning operations have been selected for the work;
in response to determining that not all possible tuning operations have been selected, selecting the tuning operation based on the tuning history; and
in response to determining that all possible tuning operations have been selected, reporting that the performance goal is not achievable with current processing system conditions.

20. The system of claim 15, wherein the operations further comprise:
storing the selected tuning operation in the tuning history.

21. The system of claim 15, wherein the operations further comprise:
determining whether the performance goal is not being met due to processing system load; and
in response to determining that the performance goal is not being met due to processing system load, issuing a report.

* * * * *